United States Patent [19]
Peterson

[11] 3,874,109
[45] Apr. 1, 1975

[54] TEASE SPOON

[76] Inventor: Carmen A. Peterson, 38 Pilot Pl., New Port Richey, Fla. 33552

[22] Filed: Feb. 26, 1973

[21] Appl. No.: 335,465

[52] U.S. Cl. ............................................. 43/42.22
[51] Int. Cl. .......................................... A01k 87/06
[58] Field of Search ............ 43/42.22, 42.23, 42.27, 43/42.47

[56] References Cited
UNITED STATES PATENTS

| | | | |
|---|---|---|---|
| 1,321,850 | 11/1919 | Rhodes | 43/42.23 |
| 2,616,205 | 11/1952 | Mason | 43/42.23 |
| 2,726,475 | 12/1955 | Wiselka | 43/42.23 X |
| 2,843,966 | 7/1958 | Ingram et al. | 43/42.23 X |
| 2,924,907 | 2/1960 | Hamilton | 43/42.22 X |
| 2,976,642 | 3/1961 | Wickman et al. | 43/42.23 X |
| 3,023,537 | 3/1962 | Madson | 43/42.22 X |

Primary Examiner—Louis G. Mancene
Assistant Examiner—J. Q. Lever
Attorney, Agent, or Firm—Stein, Orman & Fisher

[57] ABSTRACT

A fishing lure including a body being integrally connected to a stabilizing means and arranged substantially perpendicular thereto wherein a plurality of fishing line connecting elements are formed on a substantially leading edge of the body and disposed such that the path of the lure through water is at least partially determined by the line connecting element attached to the towing line. The path is further determined by a path determining portion which is connected to the stabilizing means and which is flexible and thereby movable into a plurality of positions which at least partially determines the path of the lure through water. Ballast and ballast connecting means connecting the ballast to the body are disposed on the lure wherein the location and weight of the ballast determines the depth of the lure as it travels through water.

6 Claims, 3 Drawing Figures

FIG. 1
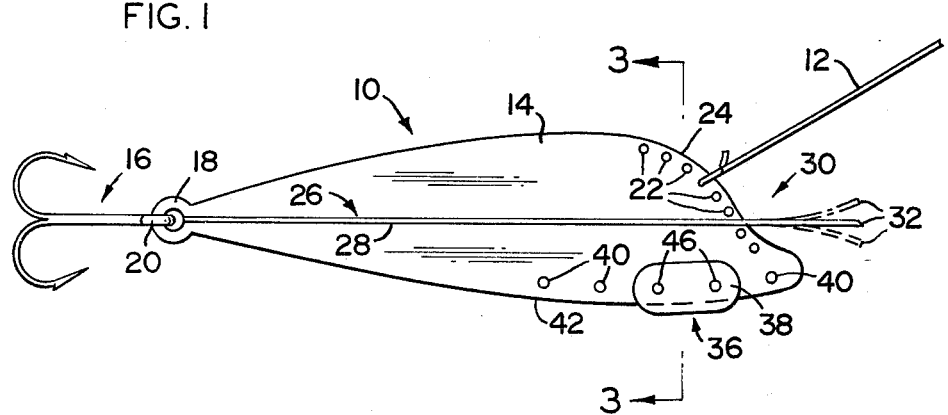
FIG. 2
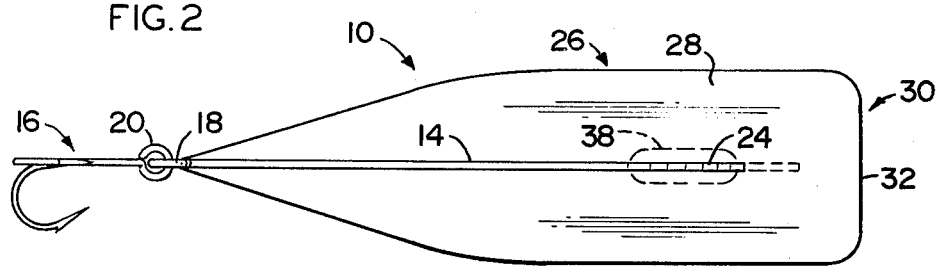
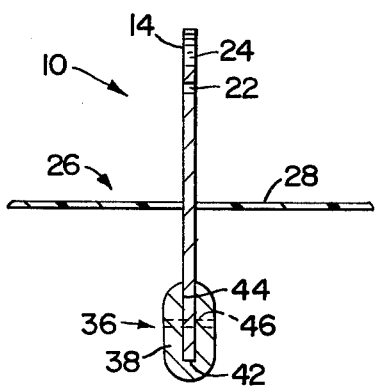
FIG. 3

TEASE SPOON

BACKGROUND OF THE INVENTION

1. Field of the Invention

This invention relates to a fishing lure of the type primarily designed to be towed through water by a conventional fishing line and which has means thereon to vary or regulate the path and/or depth of the lure as it travels through water.

2. Description of the Prior Art

Various types of fishing lures, spoons and artificial bait have been utilized almost since time began for the purpose of catching fish by means of a fishing line or conventional-type apparatus. Devices of this type have taken many shapes and configurations in an attempt to provide an efficient bait by being attractive to the fish thereby increasing the changes of the fish being caught thereby.

In the development of artificial bait, devices have taken various forms and have been specifically designed to emphasize or demonstrate the various specific factors which cause a fish to be attracted thereto. Prevalent among the most common of these factors is the configuration of the lure, the path it takes as it travels through water, as when being towed by a fishing line, and the depth at which the lure travels. To accomplish performance of the lure in the manner desired, specific structural features must be incorporated therein while at the same time allowing its configuration to demonstrate the proper effect, such as reflection, or specific movement. In addition, such a lure must be relatively inexpensive to manufacture thereby reducing the initial cost of the lure to an acceptable amount considering that the user undergoes the frequent risk of loss of the lure. Keeping initial cost in mind the lure or artificial bait must also be made from a material capable of withstanding the generally harsh environment of salt water and also the force and weight applied thereto when actually engaged by a fish being caught.

In accomplishing all of the desirable feature of artificial bait, the prior art devices have developed into relatively sophisticated multi-member devices wherein various structural elements of these devices are designed to accomplish effects such as desired movement of the bait as it passes through water, desired configuration, etc. However, a number of these devices, because of their relative sophistication, are unnecessarily complex and, therefore, both overly priced and subject to rapid deterioration and frequent breakage, both because of the harsh environment to which it is subjected and the force applied to the artificial bait when struck by a fish.

The U.S. Pat. Nos. to Bellah, 341,483, Wagner, 2,618,096, Magill, 2,741,863 and Sargent, 2,828,572 are all representative of prior art device which, while workable as designed, could be considered unnecessarily complex in their structure.

It is therefore, readily apparent that there is a need in the sport industry for a lure capable of efficiently having its performance characteristics regulated to the extent that the path of the lure through water may be predetermined and changed and the depth at which the lure travels can be established. However, it should be competitive to prior art devices from an economical standpoint. Such a lure must be durable, and simple in construction to reduce the initial cost and maintenance thereof.

SUMMARY OF THE INVENTION

This invention relates to a fishing lure of the type designed to be towed through water by a conventional fishing line or the like. The lure comprises a main body having a hook means attached to a strategic location thereon, preferably at its trailing end or extremity. The fishing line which serves to tow the lure is connected to the body by a line connecting means which itself comprises a plurality of connecting elements. These elements are in the form of apertures arranged in spaced relation to one another along at least a portion of what may be considered a leading edge of the body. These elements or apertures are arranged such that the path or orientation of the lure as it travels through water may be altered or determined dependent upon which element is connected to the towing line.

A ballast means, which may be in the form of a weight is removably or adjustably connected to the body on what may be considered a lower portion thereof. The ballast connecting means is formed on the body and comprises a plurality of connecting elements also arranged in spaced relation to one another such that the ballast may be adjustably positioned on the body in such a manner as to alter the path of travel and particularly the depth at which the lure travels through water.

The main path regulating means of the lure comprises a stabilizing means attached to the body and which may be integrally formed thereon in the form of an outwardly extending flange extending substantially along a major portion of the longitudinal axis of the lure body. The flange may be tapered inwardly to ward the rear or trailing extremity of the lure and the entire flange itself is disposed in substantially perpendicular relation to the plane defined by the lure body. The leading edge of the stabilizing means may be termed a beak portion and is particularly made from a bendable or flexible material which is sufficiently stiff or rigid to maintain the orientation or position into which it is last disposed.

This beak portion is oriented substantially in front of the leading portion of the body itself and at least partially defines the leading portion of the lure as it travels through water.

As stated above, the beak portion may be bent or positioned out of the plane defined by the flange of the stabilizing means either above or beneath this flange. This serves to regulate the "angle of attack" of the leading edge of the beak portion relative to the flow of water through which it travels. This, of course, in turn regulates the path of travel of the lure allowing it to move in a predetermined relation.

The invention accordingly comprises an article of manufacture with the features, properties and relation of elements which will be exemplified in the article hereinafter described and the scope of the invention will be indicated in the claims.

BRIEF DESCRIPTION OF THE DRAWINGS

For a fuller understanding of the nature and the objects of the invention, reference should be had to the following detailed description taken in connection with the accompanying drawings in which:

FIG. 1 is a side plan view of the lure of the present invention connected to a fishing line and having the ballast means and stabilizing means as regulated.

FIG. 2 is a top plan view of the lure of the present invention.

FIG. 3 is a sectional view, taken along line 3—3 of FIG. 1.

Similar reference characters refer to similar parts throughout the several views of the drawings.

DETAILED DESCRIPTION

As shown in FIG. 1, this invention relates to a fishing lure generally indicated as 10 of the type primarily designed to be towed through water or used in combination with a conventional fishing line 12. The lure itself comprises a body 14 having a hook means generally indicated as 16 attached to the rear or trailing extremity thereof by eyelet 18. This eyelet may be integrally attached to the body and is designed to cooperate with a correspondingly configured eyelet or connecting means 20 on the hook means 16. The line 12 is connected to the body 14 by a line connecting means comprising a plurality of connecting elements in the form of apertures 22. These apertures or connecting elements are arranged in predetermined spaced relation along one portion of a leading edge 24 of the body. Each of the apertures are dimensioned so as to be engageable by the line 12 and it is readily seen that the disposition of the apertures 22 is such as to at least partially define the path of travel of the lure through water, dependent upon to which of the apertures 24 the line 12 is attached.

The lure further comprises a stabilizing means generally indicated as 26 and including an outwardly extending stabilizing fin or flange 28 integrally formed on or connected to body 14 by any applicable means. The dimension and disposition of the stabilizing means 26, in part due to its perpendicular orientation relative to the plane of the body 14, serves to stabilize the lure as it travels through water due to the force of line 12. The rearward or trailing portion of flange 28 is inclined or angled inwardly toward the rear or trailing portion of body 14 and serves to join the body adjacent to the eyelet 18 to which hook means 16 is attached. This gives the lure a streamlined effect and facilitates its travel through water. This stabilizing means further comprises a beak portion 30 which defines the leading portion of flange 28. The leading edge 32 of beak portion 30 is positionable in a number of positions relative to the plane defined by flange 28. This is clearly shown in FIG. 1 and is accomplished by forming the beak portion from a flexible or bendable material. This allows the user of the lure to position the leading edge 32 in a path defining or determining position as the lure travels through water. It should be pointed out that the beak portion ideally has sufficient rigidity to be maintained in the folded or bended position in which it is placed.

The lure further comprises a ballast means generally indicated as 36 which may be in the form of a weight 38 connected to body 14 by ballast connecting means in the form of a plurality of connecting elements or apertures 40. These connecting apertures are arranged in spaced relation to one another so that the weight 38 may be positioned at various locations along the undersurface of the body on the opposite side of the stabilizing means 26 relative to the line connecting means in the form of apertures 22.

The ballast 38 is so configured as to position the lower edge 42 of body 14 in sandwich-like relation within slot 44 of the weight 38. Any kind of connecting pin or the like 46, which may be integrally or movably attached to weight 38, may be applied to weight 38 so as to engage the aperture 40 in the body. Again, the connecting apertures 40 and the locking pin 46 are so configured and disposed relative to one another such that the weight itself may be removed from any of the apertures 40 and connected to one of the others. This shift in location of the ballast means causes a difference in the flow or orientation of the lure as it travels through water.

It will thus be seen that the objects made apparent from the preceding description, are efficiently attained and, since certain changes may be made in the above product without departing from the scope of the invention, it is intended that all matter contained in the above description or shown in the accompanying drawings shall be interpreted as illustrative and not in a limiting sense.

It is also to be understood that following claims are intended to cover all the generic and specific features of the invention herein described, and all statements of the scope of the invention, which, as a matter of language, might be said to fall therebetween.

Now that the invention has been described,

What is claimed is:

1. A fishing lure of the type to be towed through water by a line, said lure comprising: a body, line connecting means formed on said body, ballast means connected to said body, ballast connecting means formed on said body adjacent the lower peripheral edge thereof, stabilizing means including a one piece flange connected to said body, said flange comprising a flexible beak portion integrally connected to the rest of said flange and substantially defining the leading portion of said lure, whereby said beak portion may be fixedly oriented out of the plane of the remainder of said stabilizing flange and thereby at least partially determine the path of travel of said lure; said line connecting means comprising a plurality of apertures arranged in substantially spaced relation to one another said plurality of apertures extending continuously from an upper peripheral edge of said body to a point adjacent the forwardmost leading edge of said body, said apertures extending in a continuous fashion on both sides of said stabilizing flange, whereby the point of connection of the line to said line connecting means at least partially determines, along with the predetermined position of said beak portion, the path of travel of said lure through water.

2. A fishing lure as in claim 1 further comprising ballast connecting means formed on said body and comprising ballast connecting elements arranged in predetermined spaced relation to one another, each of said elements configured to interconnect said ballast means to said body, whereby said ballast means is adjustably mounted on said body.

3. A fishing lure as in claim 2 wherein said ballast means comprises weight means, said plurality of ballast connecting elements comprising a plurality of apertures arranged in spaced relation to one another, said weight removably connected to said body.

4. A fishing lure as in claim 1 wherein said flange extends along substantially the entire length of said body and is integrally attached to said beak.

5. A fishing lure as in claim 4 wherein said flange extends outwardly from said body in a disposition substantially perpendicular to the plane defined by said body.

6. A fishing lure as in claim 1 wherein said line connecting means is disposed on said body in spaced relation to said ballast connecting means and on the opposite side of said stabilizing means.

* * * * *